United States Patent
Hirsch et al.

(10) Patent No.: US 8,639,396 B1
(45) Date of Patent: Jan. 28, 2014

(54) COOPERATIVE CONTROL OF UNMANNED AERIAL VEHICLES FOR TRACKING TARGETS

(75) Inventors: Michael J. Hirsch, St. Petersburg, FL (US); Hector J. Ortiz Pena, Orchard Park, NY (US); Christopher R. Eck, Dunedin, FL (US)

(73) Assignee: Raytheon Company, Waltham, MA (US)

( * ) Notice: Subject to any disclaimer, the term of this patent is extended or adjusted under 35 U.S.C. 154(b) by 1322 days.

(21) Appl. No.: 12/575,201

(22) Filed: Oct. 7, 2009

Related U.S. Application Data (60) Provisional application No. 61/195,669, filed on Oct. 8, 2008.

(51) Int. Cl.
*G06F 17/00* (2006.01)
*G06F 19/00* (2011.01)
*B64C 13/00* (2006.01)
*G05D 1/00* (2006.01)
*G08G 1/123* (2006.01)

(52) U.S. Cl.
USPC ............ 701/3; 701/23; 701/26; 701/302; 244/76 R; 340/995.13

(58) Field of Classification Search
USPC ......... 701/1, 2, 3, 11, 23, 400, 408, 409, 410, 701/422, 423, 466–469, 24, 26, 516, 519, 701/300, 4, 14, 25, 28, 118, 119, 120, 122, 701/411, 416, 418; 348/148, 153, 159, 143, 348/149; 244/189, 190, 175; 382/100, 103; 340/988, 995.12, 995.13, 995.19
See application file for complete search history.

(56) References Cited

U.S. PATENT DOCUMENTS

| | | | | |
|---|---|---|---|---|
| 6,130,705 | A * | 10/2000 | Lareau et al. ............... | 348/144 |
| 8,068,949 | B2 * | 11/2011 | Duggan et al. ............... | 701/24 |
| 8,229,163 | B2 * | 7/2012 | Coleman et al. ............. | 382/103 |
| 2006/0015215 | A1 * | 1/2006 | Howard et al. .............. | 700/245 |
| 2008/0319558 | A1 | 12/2008 | Resende et al. | |
| 2012/0092503 | A1 * | 4/2012 | Cheng ......................... | 348/159 |

OTHER PUBLICATIONS

Declaration of Michael J. Hirsch, including Appendix A, Hirsch et al., "*Efficient Flight Formation for Tracking of a Ground Target*," Jul./Aug. 2007, and Appendix B, Hirsch et al., "*Efficient Flight Formation for Tracking of a Ground Target*.", Dec. 3, 2010.
Hirsch et al., "Efficient Flight Formation for Tracking of a Ground Target.", Jul./Aug. 2007.

\* cited by examiner

*Primary Examiner* — Thomas Tarcza
*Assistant Examiner* — Edward Pipala
(74) *Attorney, Agent, or Firm* — Cantor Colburn LLP (57) ABSTRACT

In certain embodiments, a method includes accessing first target information associated with a first target visible to a first UAV at a first time and accessing second target information, received from a neighboring UAV, associated with a second target visible to the neighboring UAV at the first time. The method further includes combining the first target information and the second target information to generate combined target information and determining, based on the combined target information, a predicted location for the first and second targets at a second time. The method further includes determining a planned route for the first UAV for the second time by solving an optimization problem, the optimization problem accounting for the determined predicted location for the first and second targets, kinematic constraints associated with the first UAV and the neighboring UAV, and line-of-sight constraints associated with the first UAV and the neighboring UAV.

27 Claims, 4 Drawing Sheets

COOPERATIVE CONTROL OF UNMANNED AERIAL VEHICLES FOR TRACKING TARGETS

RELATED APPLICATIONS

This application claims the benefit under 35 U.S.C. §119(e) of the priority of U.S. Provisional Application No. 61/195,669, filed Oct. 8, 2008, entitled "Cooperative Control of UAVs for Multiple Target Tracking in Urban Environments."

TECHNICAL FIELD

This invention relates generally to target tracking and more particularly to cooperative control of multiple unmanned aerial vehicles (UAVs) for tracking targets.

BACKGROUND

Military forces may face a number of challenges in providing timely and accurate information (e.g., location information) regarding potential targets, particularly since potential targets may be in motion and/or may attempt to elude detection. One technique for providing target information includes the use of UAVs, which may allow target information to be obtained while reducing or eliminating the need to place military personnel in the line of fire and/or in other potentially dangerous or compromising positions.

SUMMARY

According to embodiments of the present invention, disadvantages and problems associated with previous techniques for managing UAVs may be reduced or eliminated.

In certain embodiments, a method includes accessing first target information associated with a first target visible to a first UAV at a first time and accessing second target information, received from a neighboring UAV, associated with a second target visible to the neighboring UAV at the first time. The method further includes combining the first target information and the second target information to generate combined target information and determining, based on the combined target information, a predicted location for the first and second targets at a second time. The method further includes determining a planned route for the first UAV for the second time by solving an optimization problem, the optimization problem accounting for the determined predicted location for the first and second targets, kinematic constraints associated with the first UAV and the neighboring UAV, and line-of-sight constraints associated with the first UAV and the neighboring UAV.

Particular embodiments of the present invention may provide one or more technical advantages. In certain embodiments, the present invention may provide a method by which each of a number of UAVs deployed in an airspace located in or around an urban environment (or another environment in which the UAVs may encounter line-of-sight obstructions) may dynamically determine a planned route in order to track one or more targets located in the urban environment. In other words, the present invention may provide a method for autonomous control of a number of UAVs charged with tracking one or more targets in an urban environment, which may reduce or eliminate the need for personnel to control the UAVs. Thus, personnel may be permitted to focus on other tasks, such as analyzing target information gathered by the UAVs.

Furthermore, each UAV may determine its associated planned route by solving an optimization problem that accounts for predicted locations of one or more targets in the urban environment (i.e., those targets located either in the line-of-sight of a UAV or the line or sight of a neighboring UAV), line-of-sight constraints of the UAVs (e.g., dues to structure in the urban environment), and kinematic constraints of the UAVs. As a result, the planned routes determined by each individual UAV may allow the number of UAVs to collectively gather information in a manner that minimizes location errors associated with targets located in the urban environment.

Certain embodiments of the present invention may include some, all, or none of the above advantages. One or more other technical advantages may be readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description taken in conjunction with the accompanying drawings, in which.

DESCRIPTION OF EXAMPLE EMBODIMENTS

Figure 1A:
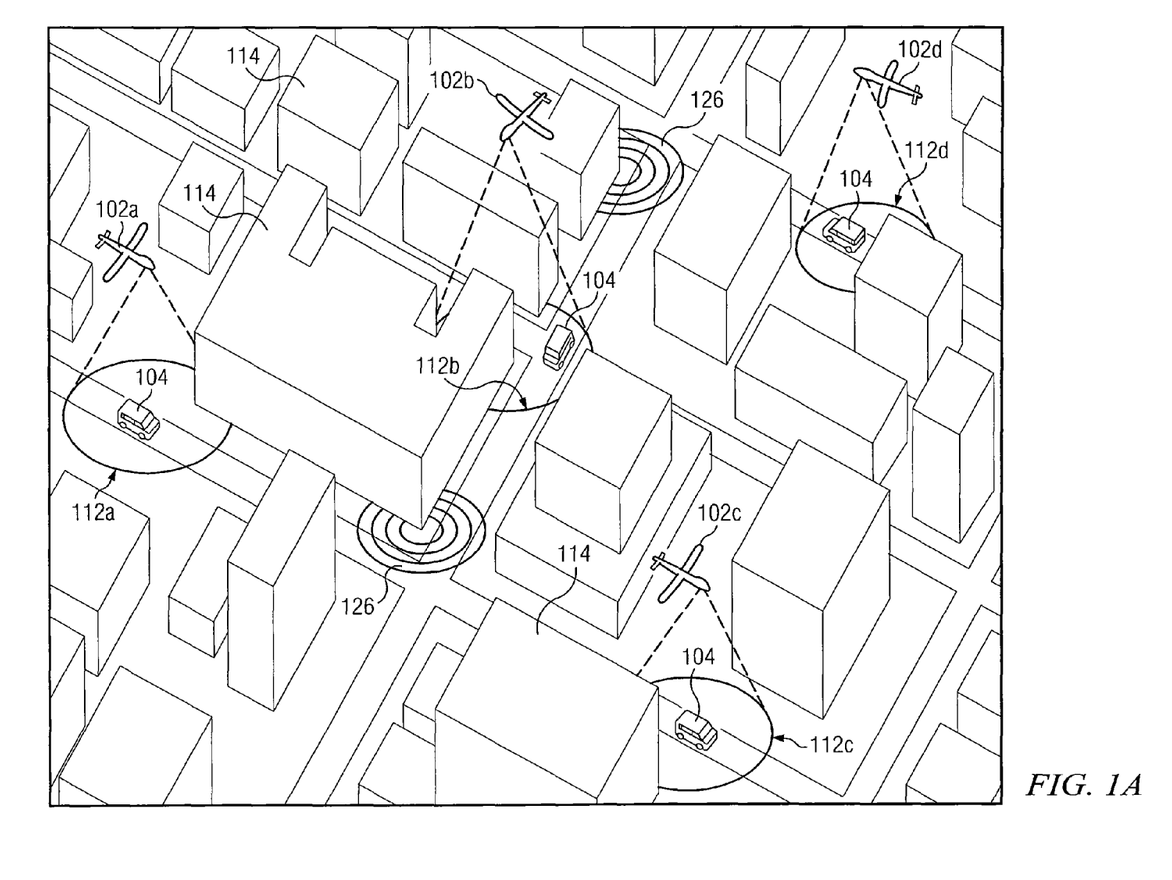
FIGS. 1A-1B illustrate an example system for providing cooperative control of UAVs for tracking targets, according to certain embodiments of the present invention.
Figure 1B:
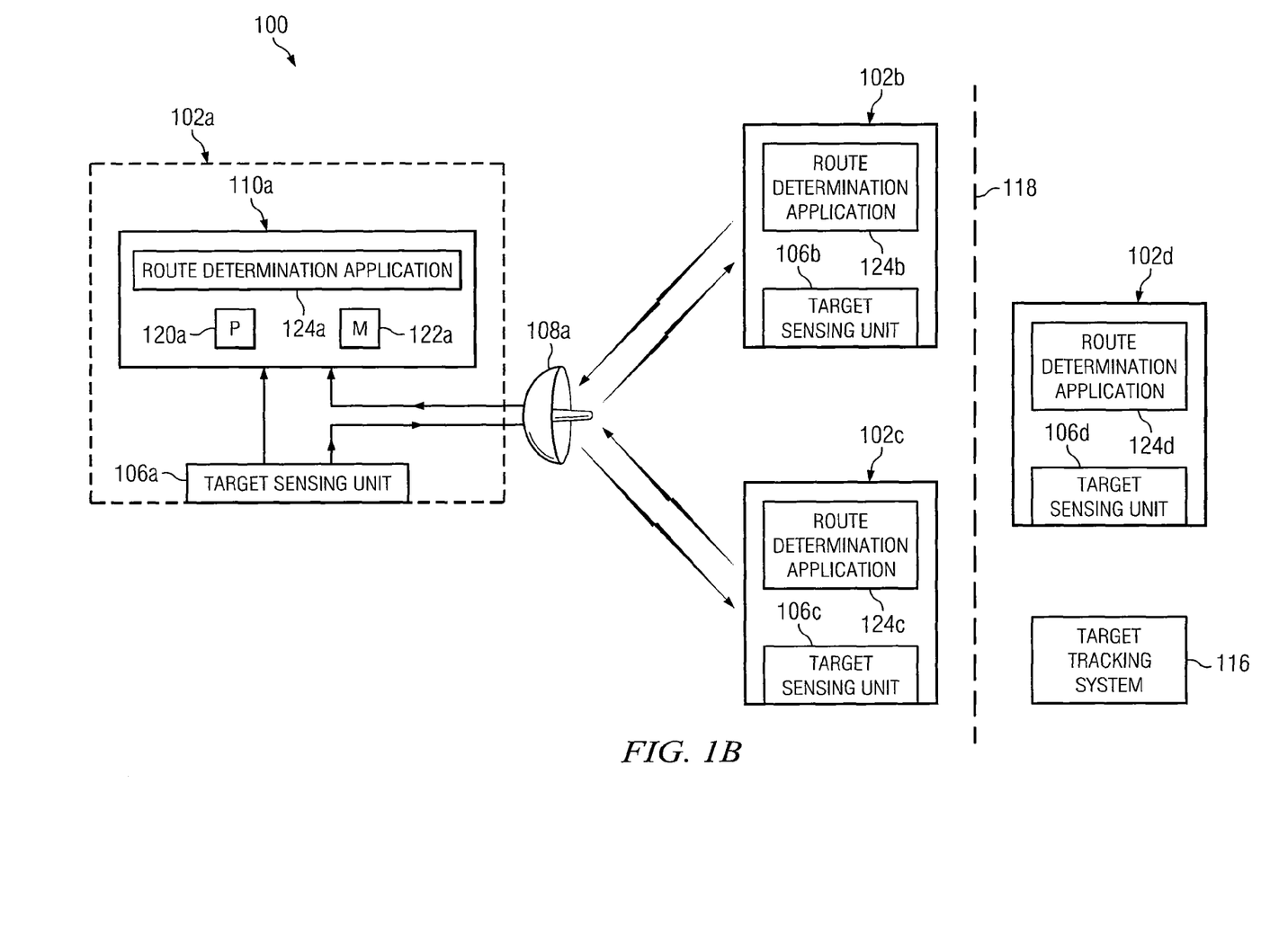

FIGS. 1A-1B illustrate an example system 100 for providing cooperative control of UAVs 102 for tracking targets 104, according to certain embodiments of the present invention. System 100 may include a number of UAVs 102 deployed in an airspace in or around an urban environment having one or more targets 104 (e.g., ground vehicles). Each UAV 102 may include a target sensing unit 106, an antenna 108, and a flight control system 110. Although this particular implementation of system 100 is illustrated and primarily described, the present invention contemplates any suitable implementation of system 100, according to particular needs.

In general, system 100 is operable to generate target information associated with one or more targets 104 (e.g., ground vehicles) in a particular environment. Each UAV 102 of system 100 may be operable to collect target information associated with one or more targets 104 located within a line-of-sight 112 of the UAV 102 or otherwise detectable to the UAV 102. In certain applications, UAVs 102 may be deployed in an airspace located in or around an environment having one or more objects that may obstruct the line-of-sight of certain UAVs 102. For example, UAVs 102 may be deployed in an airspace located in or around an urban environment having one or more structures 114 (e.g., building) that may obstruct the line-of-sight of certain UAVs 102. As an additional example UAVs 102 may be deployed in an airspace located in or around a rural environment having earth formations (e.g., mountains) that may obstruct the line-of-sight of certain UAVs 102. Because UAVs 102 may be operable to determine planned routes (i.e., flight paths) in a manner that accounts for line-of-sight obstructions (as described below), UAVs 102 may collectively generate target information associated with one or more targets 104 located in a particular environment in a manner that accounts for line-of-sight obstruction of the particular environment.

Although UAVs 102 are depicted and primarily described as being deployed in an airspace located in or around an environment having one or more objects that may obstruct the line-of-sight of certain UAVs 102, the present invention contemplates UAVs 102 being deployed in an airspace located in or around any suitable environment, according to particular needs.

One or more UAVs 102 may communicate the collected target information to a target tracking system 116, which may analyze the collected target information and/or generate target tracking information. Furthermore, because each UAV 102 may be able to sense only certain targets 104 (e.g., due to one or more line-of-sight constraints), each UAV 102 may be operable to share sensed target information with neighboring UAVs 102 (i.e., UAVs 102 located within a particular range of communication).

Each UAV 102 may be operable to combine received target information with sensed target information to create combined target information. The combined target information may provide an extended view of the urban environment from the perspective of a particular UAV 102. Each UAV 102 may be further operable to determine predicted locations associated with those targets 104 located within the extended view of the urban environment based on the combined target information. Each UAV 102 may determine a planned route by solving an optimization problem that accounts for the determined predicted locations of the targets 104, line-of-sight constraints associated with the UAV 102, and kinematic constraints associated with the UAV 102.

In other words, UAVs 102 may each be operable to dynamically determine planned routes in a manner that accounts for predicted locations of known targets 104, line-of-sight constraints, and kinematic constraints. As a result, UAVs 102 of system 100 may, collectively, generate target information associated with targets 104 in an urban environment in a manner that reduces or eliminates the need for personnel to control UAVs 102. Furthermore, because each UAV 102 may act cooperatively with neighboring UAVs 102 in determining a planned route based on an optimization problem that accounts for line-of-sight constraints and kinematic constraints of UAVs 102, the determined planned routes may result in the collection of target information in a manner that minimizes location errors associated with targets 104.

UAVs 102 of system 100 may comprise any suitable reusable, uncrewed aircraft capable of being configured with a target sensing unit 106, an antenna 108, and a flight control system 110, each of which is described detail below. As just one example, UAVs 102 may comprise a KillerBee® Unmanned Aircraft System (UAS) manufactured by RAYTHEON COMPANY of Waltham, Mass.

Although system 100 is depicted and primarily described as including a particular number of UAVs 102, the present invention contemplates system 100 including any suitable number of UAVs 102, according to particular needs. Furthermore, although the present invention is depicted and primarily described as including unmanned aerial vehicles (i.e, UAVs 102), the present invention contemplates system 100 including unmanned ground vehicles, unmanned underwater vehicles, or any other suitable unmanned vehicles, according to particular needs. It should be noted that the present invention contemplates one or more UAVs 102 carrying one or more persons, if appropriate.

Each UAV 102 of system 100 may include a target sensing unit 106, an antenna 108, a flight control system 110, and any other suitable components. Although the present invention contemplates each UAV 102 of system 100 including each of target sensing unit 106, antenna 108, and flight control system 110, for purposes of simplicity only target sensing unit 106a, antenna 108a, and a flight control system 110a of UAV 102a (depicted in FIG. 1B) are described in detail below. It is understood that the target sensing units 106, antennas 108, and flight control systems 110 of additional UAVs 102 of system 100 may operate in a substantially similar manner as described below with regard to target sensing unit 106a, antenna 108a, and a flight control system 110a of UAV 102a. Components of UAV 102a may be implemented in any suitable combination of firmware, hardware, and software.

Target sensing unit 106a of a UAV 102a may include any suitable device operable to generate target information associated with one or more targets 104 located within an associated line-of-sight 112a of radar unit 102a (or otherwise detectable to radar unit 102a). For example, target sensing unit 106a may be an omni-directional radar unit operable to generate target information associated with one or more targets 104 located within an associated line-of-sight 112a encompassing a generally conical-shaped volume extending outwardly from target sensing unit 112a.

Target sensing unit 106a may be located at any suitable location on UAV 102a and may be oriented in any suitable manner with respect UAV 102a, according to particular needs. For example, in embodiments in which target sensing unit 106a is an omni-direction radar unit, target sensing unit 106a may be located on the underside of UAV 102a and oriented with respect to UAV 102a such that the associated line-of-sight 112a encompasses a generally conical-shape including at least a portion of the surface area within the urban environment in or around which UAV 102a is deployed.

Target sensing unit 106a may be operable to generate target information associated with one or more targets 104 located within the associated line-of-sight 112a at a particular time (or over a particular range of time). Target information associated with a particular target 104 may include a location of the particular target 104, a velocity of the particular target 104, a heading of the particular target 104, or any other suitable information according to particular needs.

Target sensing unit 106a may be operable to communicate generated target information to one or more neighboring UAVs 102 (e.g., UAV 102b and UAV 102c) via antenna 108a, as described in further detail below. The generated target information may be communicated to one or more neighboring UAVs 102 as discrete units of data at predetermined time intervals (e.g., corresponding to periods of time over which target sensing unit 106a generates target information), as a continuous stream of data, or in any other suitable manner. Additionally, target sensing unit 106a may be operable to communicate generated target information to target tracking system 116. The generated target information may be communicated to target sensing unit 106a as discrete units of data at predetermined time intervals (e.g., corresponding to periods of time over which target sensing unit 106a generates target information), as a continuous stream of data, or in any other suitable manner. Target sensing unit 106a may communicate generated target information to target tracking system 116 via one or more satellite communication links, a network for facilitating wireless communications, or in any other suitable manner, according to particular needs. For example, target sensing unit 106a may communicate generated target information to target tracking system 116 via a network operable to communicate IP packets, Frame Relay frames, Asynchronous Transfer Mode (ATM) cells, voice, video, data, and other suitable information between network addresses.

Target tracking system 116 may be operable to receive and/or store the communicated target information. The target information received from each UAV 102 of system 100 may be combined, used to generate target tracks associated with targets 104, or otherwise processed to generate actionable intelligence.

Target tracking system 116 may include one or more computer systems at one or more locations. Each computer system may include any appropriate input devices (such as a keypad, touch screen, mouse, or other device that can accept information), output devices, mass storage media, or other suitable components for receiving, processing, storing, and communicating data. Both the input devices and output devices may include fixed or removable storage media such as a magnetic computer disk, CD-ROM, or other suitable media operable to both receive input from and provide output to a user of user system 102. Each computer system may include a personal computer, workstation, network computer, kiosk, wireless data port, personal data assistant (PDA), one or more processors within these or other devices, or any other suitable processing device. Additionally, target tracking system 116 may include any suitable combination of software, firmware, and hardware.

Antenna 108 of a UAV 102 (e.g., antenna 108a of UAV 102a) may include any suitable device operable to communicate target information generated by target sensing unit 106a to neighboring UAVs 102 (e.g., UAV 102b and UAV 102c) and/or receive target information generated by target sensing units 106 of neighboring UAVs 102 (e.g., UAV 102b and UAV 102c). For example, antenna 108 may be an antenna configured to send/receive radio frequency (RF) communications.

Antenna 108a may have an associated maximum communication range 118a. In other words, UAV 102a may not be able to communicate generated target information via antenna 108a to UAVs 102 located at a distance greater than the maximum communication range 118a of antenna 108a. Similarly, assuming all UAVs of system 100 have antennas 108 with associated maximum ranges that are substantially the same (which may not be the case in certain embodiments), the maximum communication range 118a of antenna 108a may also correspond to the range from beyond which UAV 102a cannot receive target information communicated by other UAVs 102.

For example, because UAVs 102b and 102c lie within the maximum communication range 118a of UAV 102a, UAV 102a may receive target information transmitted by UAVs 102b and 102c (i.e., UAVs 102b and 102c are neighboring UAVs of UAV 102a). Furthermore, because UAV 102d lies outside the maximum communication range 118a of UAV 102a, UAV 102a may not receive target information transmitted by UAV 102d (i.e., UAV 102d is not a neighboring UAV of UAV 102a). In other words, each UAV 102 of system 100 may have a different set of neighboring UAVs 102 which depends on the distance of each UAV 102 from other UAVs 102 in system 100.

Flight control system 110a of 102a may include one or more electronic computing devices operable to receive, transmit, process, and/or store information, such as target information collected by target sensing unit 106a and/or received from neighboring UAVs 102b and 102c. Flight control system 110a may be implemented using any suitable combination of software, firmware, and hardware. Flight control system 110a may include one or more processing modules (i.e., processing module 120a) and one or more memory modules (i.e., memory module 122a). A processing module as described herein may include one or more microprocessors, controllers, or any other suitable computing devices or resources and may work, either alone or with other components of system 100, to provide a portion or all of the functionality of system 100 described herein. A memory module as described herein may take the form of volatile or non-volatile memory including, without limitation, magnetic media, optical media, random access memory (RAM), read-only memory (ROM), removable media, or any other suitable memory component.

In certain embodiments, flight control system 110a includes a route determination application 124a. Route determination application 124a may be implemented using any suitable combination of hardware, firmware, and software. In general, route determination application 124a may be operable to dynamically determine planned routes (i.e., flight paths) for UAV 102 such that UAV 102a may navigate in the absence of control from a human operator, as described in further detail below.

Route determination application 124a may be operable to receive or otherwise access target information generated by target sensing unit 106a at a first time. The target information received from target sensing unit 106a may correspond to targets located within the line-of-sight 112a of target sensing unit 106a (or otherwise visible to target sensing unit 106a) at the first time. The present invention contemplates that the first time may correspond to any suitable time interval, according to particular needs. Accordingly, it is understood that references to time as used in this description may correspond to any appropriate time interval.

Route determination application 124a may be operable to receive or otherwise access target information from neighboring UAVs 102b and 102c (e.g., via antenna 108a), the target information having been generated by target sensing units 106b and 106c at the first time and communicated to UAV 102a via antennas 108b and 108c. The target information received from neighboring UAV 102b may correspond to targets 104 located within the line-of-sight 112b of target sensing unit 106b (or otherwise visible to target sensing unit 106b) at the first time and the target information received from neighboring UAV 102c may correspond to targets 104 located within the line-of-sight 112c of target sensing unit 106c (or otherwise visible to target sensing unit 106c) at the first time.

Additionally, route determination application 124a may be operable to receive or otherwise access information associated with neighboring UAVs 102b and 102c at the first time. For example, with regard to UAV 102b, route determination application 124a may receive a location of UAV 102b, a heading of UAV 102b, and a velocity of UAV 102b. Similarly, with regard to UAV 102c, route determination application 124a may receive a location of UAV 102c, a heading of UAV 102c, and a velocity of UAV 102c.

Route determination application 124a may be operable to combine the target information received from target sensing unit 106a with the target information received from neighboring UAVs 102b and 102c to generate combined target information. The generated combined target information may include target information for targets 104 located in the line-of-sight of one or more of UAV 102a, UAV 102b, and UAV 102c at the first time. In other words, the combined target information may represent a fused picture corresponding to the portions of the urban environment located within a field of view 112 of one or more of UAV 102a, UAV 102b, and UAV 102c.

In certain embodiments, route determination application 124a may determine a score associated with the combined target information. Route determination application 124a may determine the score associated with the combined target information in any suitable qualitative manner. For example, route determination application 124a may determine a score associated with the combined target information by determining an inverse of a covariance matrix associated with each target 104 of the combined target information (i.e., the determined score may comprise the inverse of the covariance matrix associated with each target 104 of the combined target information).

If the determined score associated with the combined target information is less than a pre-determined threshold score, route determination application 124a may determine a predicted location for each of the targets 104 of the combined target information (as described below). For example, if a determined inverse of a covariance matrix associated with a target 104 of the combined target information is less than a predetermined threshold value, route determination application 124a may determine a predicted location for each of the targets 104 of the combined target information. Additionally or alternatively, if the amount of time that has passed since route determination application 124a last determined a planned route for UAV 102a (as described below) is greater than a pre-determined amount of time, route determination application 124a may determine a predicted location for each of the targets 104 of the combined target information (as described below).

If the determined score associated with the combined target information is greater than the pre-determined threshold score and the elapsed time since the last planned route determination is less than the pre-determined amount of time, the combined target information corresponding to the first time may be discarded (i.e., route determination application 124a may not determine a predicted location for each of the targets 104 of the combined target information).

Route determination application 124a, using the generated combined target information corresponding to target information generated at a first time, may be operable determine a predicted location for each target 104 of the combined target information at a second time. In other words, route determination application 124a may be operable to propagate forward (from a first time to a second time) a location for each of the targets 104 located in the line-of-sight 112 associated with one or more of UAV 102a, UAV 102b, and UAV 102c.

As a particular example, the determined predicted location for the target 104 at the second time may correspond to a location relative to the sensed location (i.e., the location included in the combined target information) that is at a distance corresponding to the velocity of the target 104 (as determined from the combined target information) multiplied by the time between the first time and the second time and in a direction corresponding to the heading of the target 104 (as determined from the combined target information).

Route determination application 124a may determine a planned route for UAV 102a for the second time by solving an optimization problem. The optimization problem (an example of which is described below) may be solved using any suitable procedure, according to particular needs. In certain embodiments, the optimization problem may be solved using a continuous Greedy Randomized Adaptive Search Procedure (GRASP), described in further detail below with regard to FIG. 3.

In certain embodiments, the optimization problem accounts for the location information of UAV 102a (e.g., location, heading, and velocity of UAV 102a), the location information of neighboring UAVs 102b and 102c (e.g., location, heading, and velocity of UAV 102b and 102c), and the predicted locations of targets 104 of the combined target information. Additionally, the optimization problem may account for a number of constraints. The constraints may include line-of-sight constraints associated with UAV 102a and/or line-of-sight constraints associated with neighboring UAVs 102b and 102c. A line-of-sight constraint for a UAV 102 may define one or more areas that would be within a line-of-sight of a target sensing unit 106 of the UAV 102 but for an obstruction (e.g., structures 114). The constraints may also include kinematic constraints of UAVs 102a, 102b, and 102c. A kinematic constraint of a UAV 102 may include any physical limitation related to the flight characteristics of the UAV 102, such as a maximum velocity of the UAV 102, a minimum velocity of the UAV 102, and a minimum turning radius of the UAV 102.

Although the optimization problem solved by route determination application 124a in determining a planned route for UAV 102a at a second time is primarily described as accounting for particular information and constraints, the present invention contemplates the optimization problem accounting for any suitable information and/or constraints, according to particular needs.

In certain embodiments, route determination application 124a may solve an optimization problem by minimizing a sum of determinants of covariances for each of the targets 104 of the combined target information over a time interval from the first time to the second time. By solving the optimization problem in this manner, route determination application 124a may determine optimal planned routes for UAVs 102a, 102b, and 102c for the second time, the optimal planned routes being routes that place UAVs 102a, 102b, and 102c in the best possible position (e.g., taking into account line-of-sight and kinematic constraints) at the second time to generate target information for the targets 104 (i.e., those targets 104 of the combined target information for the first time).

In certain embodiments, route determination application 124a may solve an optimization problem by minimizing a weighted sum of determinants of covariances for each of the targets 104 of the combined target information over a time interval from the first time to the second time, the sum of determinants of covariances being weighted with an importance function. The importance function may define one or more regions of interest 126 for which accurate target information is of increased importance. In other words, the importance function may weight the minimization in a manner that results in planned route determinations that place an increased importance on obtained accurate target information for target 104 in particular areas of interest 126.

Route determination application 124a, based on the determined planned route for UAV 102a by solving the optimization problem, may implement the determined planned route for UAV 102a (i.e., route determination application may cause UAV 102a to follow the determined planned route at the second time). Although planned routes may be determined for neighboring UAVs 102b and 102c by solving the optimization problem (as described above), the planned routed determined for UAVs 102b and 102c may not be implemented. Route determination applications 124b and 124c of UAVs 102b and 102c, respectively, may determine a more optimal planned route for UAVs 102b and 102c, and UAVs 102b and 102c may implement these more optimal determined planned routes.

For example, route determination application 124b of UAV 102b may determine a planned route for UAV 102b by solving an optimization problem that accounts for information not available to UAV 102a (e.g., target information generated by UAV 102d); thus, the planned route for UAV 102b determined by route determination application 124b may be more optimal than the planned route for UAV 102b determined by route determination application 124a of UAV 102a. In other words, a particular UAV 102 may determine a planned route for itself and a planned route for each of its neighboring UAVs 102, but in certain embodiments the particular UAV 102 may only implement the planned route determined for itself.

An example optimization problem that may be solved by a route determination application 124 of a particular UAV 102 (e.g., route determination application 124a of UAV 102a) to determine planned routes for the particular UAV 102 any neighboring UAVs 102 is described in further detail below. The optimization problem described below is provided for example purposes only and the present invention contemplates any suitable optimization problem, according to particular needs. Furthermore, although the example optimization problem is described as accounting for particular parameters, decision variables, and constraints, the present invention contemplates the optimization problem accounting for any suitable parameters, decision variables, and constraints, according to particular needs.

The example optimization problem assumes that system 100 includes N homogeneous UAVs 102 flying at a fixed altitude. The UAVs 102 are modeled as non-holonomic point masses on a two-dimensional plane (i.e., a Dubin's vehicle) having a number of kinematic constraints (e.g., a minimum turning radius, a minimum velocity, and a maximum velocity). Additionally, the UAVs 102 are modeled as having a maximum communication range 118 (e.g., associated with an antenna 108, as described above), beyond which information (e.g., target information and location information) cannot be shared.

The parameters, decision variables, and constraints defined below may be defined for all $\hat{1} \in N_i(t)$, $t \in [t_c, t_c + \Delta_t]$, $l \in \{1, \ldots, 5\}$, $h \in \{1, \ldots H\}$, $j \in \{1, \ldots, J\}$, $u \in \{1, \ldots, 4\}$ as appropriate.

I. Parameters

The optimization problem may include the following parameters:

$t_c$=the current time;
$\Delta_t$=the current planning horizon;
$C_d$=the maximum distance at which any two UAVs may share information (i.e., the maximum distance at which two UAVs may be considered neighbors);
$N_i(t)$=The neighbors of UAV $\hat{1}$, at time t
(i.e., $\hat{1} \in N_i(t) \Rightarrow \|P_i(t) - P_{\hat{1}}(t)\|_2 \leq C_d$. N.B.: $i \in N_i(t)$);
The UAVs of interest (from UAV $\hat{1}$'s perspective) are indexed by $\hat{1} \in N_i(t)$;
The moving ground targets are indexed by $j \in \{1, \ldots, J\}$
The buildings (3D, rectangular, opaque obstacles) are indexed by $h \in \{1, \ldots H\}$;
$\Omega_{\hat{1}}$=The minimum turning radius of UAV $\hat{1}$;
$P_{\hat{1}}^c$=The current position of UAV $\hat{1}$ (N.B.: $P_{\hat{1}}^c = \{x_{\hat{1}}^c, y_{\hat{1}}^c, z_{\hat{1}}^c\}$)
$S_{\hat{1}}^{min}$=The minimum speed of UAV $\hat{1}$;
$S_{\hat{1}}^{max}$=The maximum speed of UAV $\hat{1}$;
$\epsilon_1^{min}$=The minimum distance allowed between any two UAVs (to avoid UAV collisions);
$\epsilon_2^{min}$=The minimum distance allowed between any UAV and any known building (assume $\epsilon_2^{min}=0$ so that UAVs are constrained to not be within a building, but they can get infinitesimally close to the perimeter of each building);
$Z_{\hat{1}}$=The fixed altitude of UAV $\hat{1}$;
$B_h = \{P_{hl}\}_{l=1}^5$=The representation of building h, as a set of 5 rectangular regions (i.e., faces) in $R^3$, all oriented in the same counter-clockwise fashion;
$P_{hl} = \{\rho_{hl1}, \ldots, \rho_{hl4}\}$=The l-th oriented rectangle (i.e., face) of building h;
$\rho_{hlu} = \{\bar{x}_{hlu}, \bar{y}_{hlu}, \bar{z}_{hlu}\}$=The u-th point of the l-th oriented rectangle (i.e., face) of building h;
$\xi_{hl} = \{v_{hl}; d_{hl}\}$=The plane containing face $P_{hl}$, represented as a normal vector $n_{hl}$ and distance to the origin $d_{hl}$ ($v_{hl} = [=\rho_{hl3} - \rho_{hl2}] \times [\rho_{hl1} - \rho_{hl2}]$, $d_{hl} = v_{hl} \cdot \rho_{hl1}$);
$\gamma(x,y)$=A function representing the 'importance' level of position (x,y) (the higher this value, the more important it is to provide accurate track of targets near (x,y));
$\Lambda_{\hat{1}j}(t)$=The Plüker coordinate representation of the oriented line from the position of UAV $\hat{1}$ at time t, $P_{\hat{1}}(t)$, to the estimated position of target j, at time t, $X_j^i(t)$;
$\hat{\Lambda}_{hlu, u+1}$=The Plüker coordinate representation of the oriented line from $\rho_{hl2}$, to $\rho_{hl,u+1}$, with $u+1 \equiv 1$ when u=4;
$G(\alpha, \hat{\alpha}) = \alpha_1\hat{\alpha}_6 + \alpha_2\hat{\alpha}_5 + \alpha_3\hat{\alpha}_4 + \alpha_4\hat{\alpha}_3 - \alpha_5\hat{\alpha}_2 + \alpha_6\hat{\alpha}_1$ where $\alpha = \{\alpha_1, \ldots, \alpha_6\}$ and $\hat{\alpha} = \{\hat{\alpha}_1, \ldots, \hat{\alpha}_6\}$ are the Plüker coordinate representations of two oriented lines;
$R_{\hat{1}}(t)$=The measurement noise for the sensor on board UAV $\hat{1}$, at time t $$\left(N.B.:: R_{\hat{1}}(t) = \begin{pmatrix} \sigma_{r\hat{1}} & 0 \\ 0 & \sigma_{b\hat{1}} \end{pmatrix}\right),$$

where $\sigma_{r\hat{1}}$=the range measurement error for the radar platform on UAV $\hat{1}$ and $\sigma_{b\hat{1}}$=the bearing measurement error for the radar platform on UAV $\hat{1}$);
$F_{\hat{1}}(t)$=The system dynamics matrix for the sensor on board UAV $\hat{1}$, at time t;
$\bar{Q}_{\hat{1}}(t)$=The process noise for the sensor on board UAV $\hat{1}$, at time t;
$H_{\hat{1}}(t)$=The observation matrix for the sensor on board UAV $\hat{1}$, at time t; and
M=A large enough constant (needed for constraints 7, 14, 15, and 18, described in further detail below).

II. Decision Variables

The optimization problem may include the following decision variables:

$P_{\hat{1}}(t)$=The position of UAV $\hat{1}$ at time t (N.B.: $P_{\hat{1}}(t) = \{x_{\hat{1}}(t), y_{\hat{1}}(t), z_{\hat{1}}\}$);
$S_{\hat{1}}(t)$=The speed of UAV $\hat{1}$ at time t;
$\theta_{\hat{1}}(t)$=The heading of UAV $\hat{1}$ at time t;
$\{X_{\hat{1}j}(t), \Sigma_{\hat{1}j}(t)\}$=The estimated position and covariance of target j by UAV $\hat{1}$ at time t;
$\{X_j^{\hat{1}}(t), \Sigma_j^{\hat{1}}(t)\}$=The fused position and covariance of target j, from UAV $\hat{1}$'s perspective at time t;

$$\phi_{\hat{1}jhl,u+1}(t) = \begin{cases} 1 & \text{if line segment } \Lambda_{\hat{1}j}(t) \text{ is oriented counterclockwise with respect to line segment } \hat{\Delta}_{hlu,u+1} \text{ at time } t \\ 0 & o.w \end{cases};$$

$\phi_{\hat{1}jhl}(t)$=The number of line segments representing the l-th face of building h that line segment $\Lambda_{\hat{1}j}(t)$ is oriented counterclockwise with respect to, at time t;

$$\beta_{\hat{1}jhl}(t) = \begin{cases} 1 & \text{if line segment } \Lambda_{\hat{1}j}(t) \text{ does not intersect the l-th face of building } h, \text{ at time } t \\ 0 & o.w. \end{cases};$$

$\beta_{\hat{1}jhl}(t)$ = The number of faces representing building h that line segment $\Lambda_{\hat{1}j}(t)$ does not intersect, at time t;

$$\psi_{\hat{1}jh}(t) = \begin{cases} 1 & \text{if there is line of sight from UAV } \hat{1} \text{ to target} \\ & j \text{ with respect to building } h, \text{ at time } t \\ 0 & \text{o.w.} \end{cases}$$

$\hat{\psi}_{\hat{1}j}(t)$ = The number of buildings that do not restrict line-of-sight from UAV $\hat{1}$ to target j, at time t; and $$\psi_{\hat{1}j}(t) = \begin{cases} 1 & \text{if UAV } \hat{1} \text{ has line of sight to target } j, \text{ at time } t \\ 0 & \text{o.w.} \end{cases}$$

III. Constraints

The following is a list of constraints levied on the above-described decision variables for the example optimization problem:

Constraint 1 prescribe initial positions for each of the UAVs in $N_i(t)$.

$$P_{\hat{1}}(t_c) = P_{\hat{1}}^c \forall \hat{1} \qquad \text{Constraint 1}$$

Constraints 2-3 define the motion of UAV $\hat{1}$, as a function of the speed and heading of the UAV.

$$\frac{\partial x_{\hat{1}}(t)}{\partial t} = S_{\hat{1}}(t)\cos[\theta_{\hat{1}}(t)] \forall \hat{1}, t \qquad \text{Constraint 2}$$

$$\frac{\partial y_{\hat{1}(t)}}{\partial t} = S_{\hat{1}}(t)\sin[\theta_{\hat{1}}(t)] \forall \hat{1}, t \qquad \text{Constraint 3}$$

Constraint 4 restricts the instantaneous change in heading of UAV $\hat{1}$ to be less than $\Omega_{\hat{1}}$ (i.e., modeling the UAVs as Dubin's vehicles);

$$\left| \frac{\partial \theta_{\hat{1}(t)}}{\partial t} \right| \leq \Omega_{\hat{1}} \forall \hat{1}, t \qquad \text{Constraint 4}$$

Constraint 5 defines a minimum and maximum velocity associated with UAV $\hat{1}$.

$$S_{\hat{1}}^{min} \leq S_{\hat{1}}(t) \leq S_{\hat{1}}^{max} \forall \hat{1}, t \qquad \text{Constraint 5}$$

Constraint 6 enforces that no two UAVs are allowed to be closer than $\epsilon_1^{min}$.

$$\|P_{\hat{1}_1}(t) - P_{\hat{1}_2}(t)\|_2 \epsilon_1^{min} \forall \hat{1}_1, \hat{1}_2, t \qquad \text{Constraint 6}$$

Constraints 7-8 prescribe that no UAV trajectory can intersect with the boundary of any building.

$$P_{\hat{1}}(t) \cdot v_{hl} + d_{hl} \geq -u_{\hat{1}hl}(t)M \forall \hat{1}, h, l, t \qquad \text{Constraint 7}$$

$$\sum_{l=1}^{5} \mu_{\hat{1}hl}(t) \leq 4 \forall \hat{1}, h, l, t \qquad \text{Constraint 8}$$

Constraints 9-10 determine the fused covariance and state for target j at time t from UAV $\hat{1}$'s perspective based on those neighbors of UAV $\hat{1}$ that have line-of-sight to target j.

$$\sum_{j}^{i}(t) = \left[ \sum_{\hat{1} \in N_j(t)} \psi_{\hat{1}j}(t) \sum_{\hat{1}j}^{1}(t) \right]^{-1} \forall j, t \qquad \text{Constraint 9}$$

$$X_j^i(t) = \sum_{j}^{i}(t) \cdot \left[ \sum_{\hat{1} \in N_j(t)} \psi_{\hat{1}j}(t) \sum_{\hat{1}j}^{-1}(t) X_{\hat{1}j}(t) \right] \forall j, t \qquad \text{Constraint 10}$$

Constraints 11-13 are continuous time Kalman filter (Kalman-Bucy filter) equations for the state of target j, as seen from UAV $\hat{1}$, where $\bar{z}_{\hat{1}j}(t)$ represents the measurement of target j by UAV $\hat{1}$, at time t.

$$\frac{\partial X_{\hat{1}j}(t)}{\partial t} = F_{\hat{1}}(t)X_{\hat{1}j}(t) + K_{\hat{1}}(t)[\bar{z}_{\hat{1}j}(t) - H_{\hat{1}}(t)X_{\hat{1}j}(t)] \forall \hat{1}, j, t \qquad \text{Constraint 11}$$

$$\frac{\partial \sum_{\hat{1}j}(t)}{\partial t} = F_{\hat{1}}(t)\sum_{\hat{1}j}(t) + \sum_{\hat{1}j}(T)F_{\hat{1}}^T(t) + \bar{Q}_{\hat{1}}(t) - K_{\hat{1}}(t)R_{\hat{1}}(t)K_{\hat{1}}^T(t) \forall \hat{1}, j, t \qquad \text{Constraint 12}$$

$$K_{\hat{1}}(t) = \Sigma_{\hat{1}j}(t)H_{\hat{1}}^T(t)R_{\hat{1}}^{-1}(t) \forall \hat{1}, j, t \qquad \text{Constraint 13}$$

Constraints 14-15 force $\bar{\phi}_{\hat{1}hlu,u+1}(t)$ to be 1 when line segment $\Lambda_{\hat{1}j}(t)$ is oriented counterclockwise with respect to the line segment $\hat{\Lambda}_{hlu,u+1}(t)$, at time t, and to be zero otherwise.

$$G(\Lambda_{\hat{1}j}(t), \hat{\Lambda}_{hlu,u+1}) \leq \bar{\phi}_{\hat{1}jhlu,u+1}(t) M \forall \hat{1}, j, h, l, u, t \qquad \text{Constraint 14}$$

$$-G(\Lambda_{\hat{1}j}(t), \hat{\Lambda}_{hlu,u+1}) < (1 - \bar{\phi}_{jhlu,u+1}(t)) M \forall \hat{1}, j, h, l, u, t \qquad \text{Constraint 15}$$

Constraint 16 counts the number of line segments representing the l-th face of building h that line segment $\Lambda_{\hat{1}j}(t)$ is oriented counterclockwise with respect to at time t.

$$\bar{\phi}_{\hat{1}jhl}(t) = \sum_{u=1}^{4} \bar{\phi}_{\hat{1}jhlu,u+1}(t) \forall \hat{1}, j, h, l, t \qquad \text{Constraint 16}$$

Constraints 17-18 force $\beta_{\hat{1}jhl}(t)$ to be 1 when line segment $\Lambda_{\hat{1}j}(t)$ does not intersect the l-th face of building h, at time t, and to be zero otherwise.

$$\beta_{\hat{1}jhl}(t) M \geq 4 - \bar{\phi}_{\hat{1}jhl}(t) \forall \hat{1}, j, h, l, t \qquad \text{Constraint 17}$$

$$\beta_{\hat{1}jhl}(t) M \geq 4 - \bar{\phi}_{\hat{1}jhl}(t) \forall \hat{1}, j, h, l, t \qquad \text{Constraint 18}$$

Constraint 19 counts the number of faces of building h that do not inhibit line-of-sight from UAV $\hat{1}$ to target j, at time t.

$$\beta_{\hat{1}jhl}(t) = \sum_{l=1}^{5} \beta_{\hat{1}jhl}(t) \forall \hat{1}, j, h, t \qquad \text{Constraint 19}$$

Constraints 20-21 force $\overline{\psi}_{\hat{1}jh}(t)$ to be 1 when there is line-of-sight from UAV $\hat{1}$ to target j, at time t, with respect to building h, and to be zero otherwise.

$$\overline{\psi}_{\hat{1}jh}(t) \leq \beta_{\hat{1}jhl}(t) \forall \hat{1}, j, h, t \qquad \text{Constraint 20}$$

$$1 - \overline{\psi}_{\hat{1}jh}(t) \leq 5 - \overline{\beta}_{\hat{1}jh}(t) \forall \hat{1}, j, h, t \qquad \text{Constraint 21}$$

Constraint 22 count the number of buildings that do not inhibit line-of-sight from UAV $\hat{1}$ to target j, at time t.

$$\hat{\psi}_{\hat{1}j}(t) = \sum_{h=1}^{H} \overline{\psi}_{\hat{1}jh}(t) \forall \hat{1}, j, t \qquad \text{Constraint 22}$$

Constraints 23-24 force $\psi_{\hat{1}j}(t)$ to be 1 when UAV $\hat{1}$ has line-of-sight to target j, at time t, and to be zero otherwise.

$$\psi_{\hat{1}j}(t) \leq \overline{\psi}_{\hat{1}jh}(t) \forall \hat{1}, j, t \qquad \text{Constraint 23}$$

$$1 - \psi_{\hat{1}j}(t) \leq H - \hat{\psi}_{\hat{1}j}(t) \forall \hat{1}, j, t \qquad \text{Constraint 24}$$

Constraints 25-29 prescribe domain restrictions on all of the decision variables, described above.

$$P_{\hat{1}}(t) \in R^3 \forall \hat{1}, t \qquad \text{Constraint 25}$$

$$S_{\hat{1}}(t) \in R_+ \forall \hat{1}, t \qquad \text{Constraint 26}$$

$$\theta_{\hat{1}}(t) \in [-\pi, \pi] \forall \hat{1}, t \qquad \text{Constraint 27}$$

$$\overline{\phi}_{\hat{1}jhl}(t), \psi_{\hat{1}j}(t), \beta_{\hat{1}jh}(t) \in Z^+ \forall \hat{1}, j, h, l, t \qquad \text{Constraint 28}$$

$$\overline{\phi}_{jhlu,u+1}(t), \psi_{\hat{1}j}(t), \beta_{\hat{1}jhl}(t), \mu_{hl}(t), \overline{\psi}_{\hat{1}jh}(t) \in \{0,1\} \forall \hat{1}, j, h, l, u, t \qquad \text{Constraint 29}$$

III. Objective Function (For UAV $\hat{1}$)

An objective function, F (as defined in Equation 1 below) may minimize the weighted sum of the determinants of the fused covariances for the targets 104 that are known to UAV $\hat{1}$, over the time interval from $t_c$ to $t_c + \Delta_t$. The weighting used is the importance function, $\gamma$, which defines regions of the domain where it is more important to have accurate positional information on a ground target.

$$F = \min \int_{t_c}^{t_c + \Delta_1} \sum_{j=1}^{J} \left[ \gamma(X_j^i(\tau)) \left| \sum_{j}^{i} (\tau) \right| \right] d\tau \qquad \text{Equation 1}$$

In other words, by minimizing Equation 1 (i.e., the optimization problem described above) and taking into account each of the parameters, decision variable, and constraints described above, an optimal planned route may be determined for UAV $\hat{1}$ (e.g., UAV 102a, described above). In certain embodiments, a continuous GRASP procedure (described in detail below with regard to FIG. 3) may be used to solve the optimization problem (i.e., to minimize the weighted sum of the determinants of the fused covariances for the targets 104 that are known to UAV $\hat{1}$).

Although a particular number of elements of system 100 have been illustrated and primarily described, the present invention system 100 including any suitable number of such components. Furthermore, although route determination applications 124 of UAVs 102 have been described as determining planned routes based on a particular optimization equation taking into account particular constraints, the present invention contemplates route determination applications 124 of UAVs 102 determining planned routes based on any suitable optimization equation taking into any suitable constraints, according to particular needs In operation of an example embodiment of system 100, route determination application 124a of a particular UAV 102a may access target information generated by target sensing unit 106a at a first time. Route determination application 124a may access target information from neighboring UAVs 102b and 102c, the target information having been generated by target sensing units 106b and 106c at the first time.

Route determination application 124a may combine the target information received from target sensing unit 106a with the target information received from neighboring UAVs 102b and 102c to generate combined target information. Route determination application 124a determines a score associated with the combined target information in any suitable qualitative manner. If route determination application 124a determines that the score associated with the combined target information is less than a pre-determined threshold score (or that the amount of time elapsed since route determination application 124a last determined a planned route for UAV 102a is greater than a pre-determined amount of time), route determination application 124a determines a predicted location for each target 104 of the combined target information at a second time.

Route determination application 124a may determine a planned route for UAV 102a for the second time by solving an optimization problem that accounts for the location information (e.g., location, heading, and velocity) of UAV 102a, the location information (e.g., location, heading, and velocity) of neighboring UAVs 102b and 102c, the predicted locations of targets 104 of the combined target information, and a number of constraints (including line-of-sight constraints and kinematic constraints)

Route determination application 124a may update the planned route for UAV 102a for the second time to be the planned route determined for UAV 102a, update the first time to be equal to the second time, and cause UAV 102a to move according to the determined planned route.

A determination may be made as to whether the method is complete. If it is determined that the method is complete (e.g., based on an input from target tracking system 116), the methods ends. Otherwise, route determination application 124a may access target information generated by target sensing unit 106a at the second time. Route determination application 124a may determine that the method is complete in response to, for example, an input from a user of target tracking system 116 indicating that UAV 102a no longer needs to track targets 104.

Particular embodiments of the present invention may provide one or more technical advantages. In certain embodiments, the present invention may provide a method by which each of a number of UAVs 102 deployed in an airspace located in or around an urban environment (or another environment in which the UAVs may encounter line-of-sight obstructions) may dynamically determine a planned route in order to track one or more targets 104 in the urban environment. In other words, the present invention may provide for autonomous control of a number of UAVs 102 charged with tracking one or more targets 104 in an urban environment, which may reduce or eliminate the need for personnel to control the UAVs 102. Thus, personnel may be permitted to focus on other tasks, such as analyzing target information gathered by the UAVs 102.

Furthermore, a route determination application 124 of each UAV 102 may determine a planned route by solving an optimization problem that accounts for predicted locations of one or more targets 104 in the urban environment (i.e., those targets 104 located either in the line-of-sight 112 of the UAV 102 or the line or sight 112 of a neighboring UAV 102), line-of-sight constraints of the UAVs 112 (e.g., due to structure 114 in the urban environment), and kinematic constraints of the UAVs 102. As a result, the planned routes determined by each individual UAV 102 may allow the number of UAVs 102 of system 100 to collectively gather information in a manner that minimizes location errors associated with targets 104 located in the urban environment.

Figure 2:
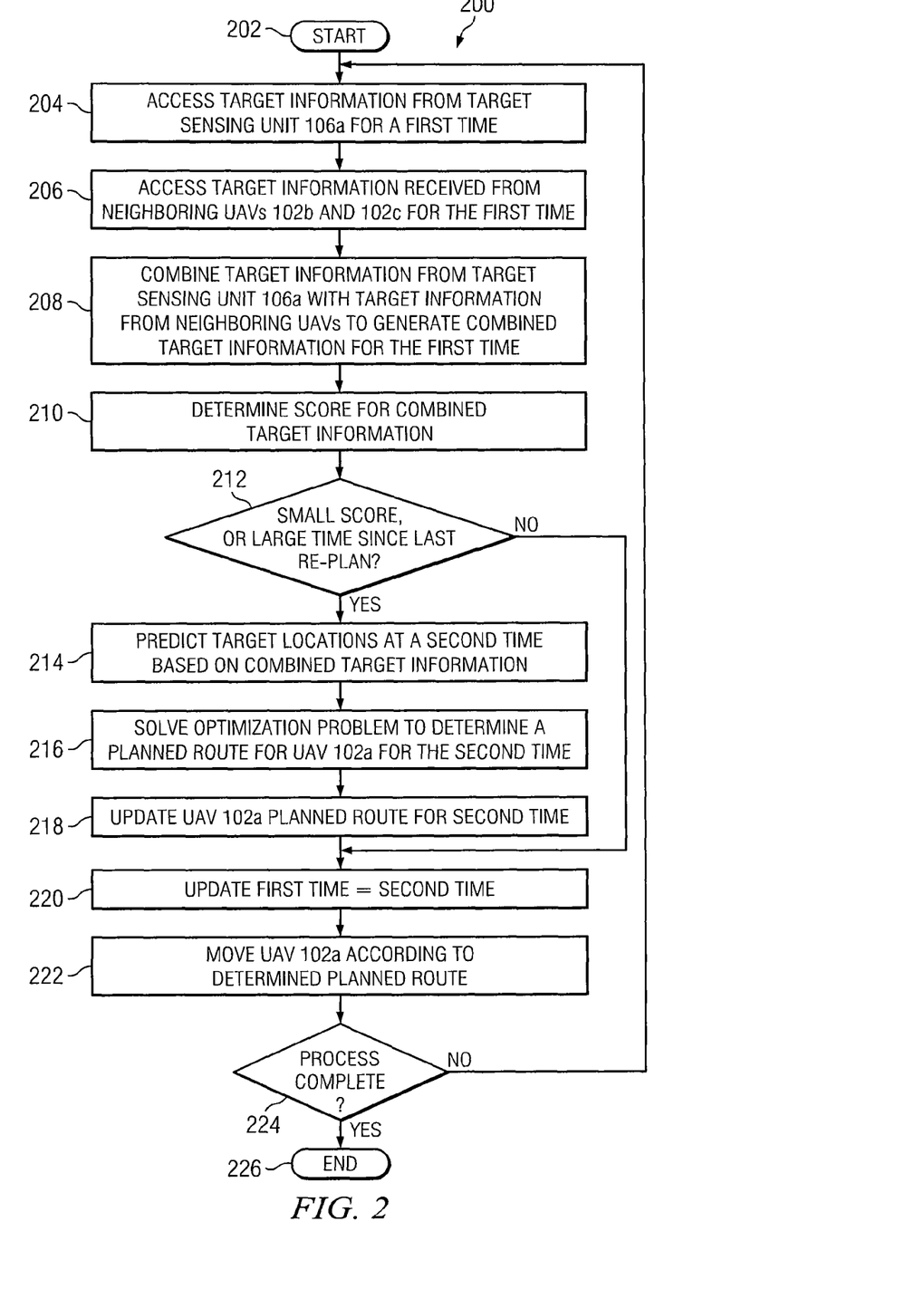
FIG. 2 illustrates an example method for providing cooperative control of UAVs for tracking targets, according to certain embodiments of the present invention.

FIG. 2 illustrates an example method 200 for providing cooperative control of UAVs 102 for tracking targets 104, according to certain embodiments of the present invention. For purposes of simplicity, the example method is described as being performed by route determination application 124a of UAV 102 (as described above with regard to FIG. 1); however, the present invention contemplates the described method as being performed by any route determination application of any UAV 102 of system 100.

The method begins at step 202. At step 204, route determination application 124a accesses target information generated by target sensing unit 106a at a first time. The target information received from target sensing unit 106a may correspond to targets located within the line-of-sight 112a of target sensing unit 106a at the first time. At step 206, route determination application 124a accesses (e.g., via antenna 108a) target information from neighboring UAVs 102b and 102c, the target information generated by target sensing units 106b and 106c at the first time and communicated to UAV 102a via antennas 108b and 108c.

The target information received from neighboring UAV 102b may correspond to targets located within the line-of-sight 112b of target sensing unit 106b at the first time and the target information received from neighboring UAV 102c may correspond to targets located within the line-of-sight 112c of target sensing unit 106c at the first time. Additionally, route determination application 124a may receive location information associated with neighboring UAVs 102b and 102c (e.g., location, heading, and velocity associated with UAVs 102b and 102c).

At step 208, route determination application 124a combines the target information accessed from target sensing unit 106a with the target information accessed from neighboring UAVs 102b and 102c to generate combined target information. The generated combined target information may include target information (e.g., position, heading, and velocity) for targets 104 located in the line-of-sight of one or more of UAV 102a, UAV 102b, and UAV 102c at the first time. In other words, the combined target information may represent a fused picture corresponding to the portions of the urban environment located within a field of view 112 of one or more of UAV 102a, UAV 102b, and UAV 102c.

At step 210, route determination application 124a determines a score associated with the combined target information. Route determination application 124a may determine the score associated with the combined target information in any suitable qualitative manner. At step 212, route determination application 124a determines if the score associated with the combined target information is less than a pre-determined threshold score or if the amount of time that elapsed since route determination application 124a last determined a planned route for UAV 102a is greater than a pre-determined amount of time. If the determination at step 212 is "yes" the method continues to step 214. If the determination in step 212 is "no" the combined target information corresponding to the first time is discarded and the method continues to step 220, as described below.

At step 214, route determination application 124a determines a predicted location for each target 104 of the combined target information at a second time. In other words, route determination application 124a propagates forward (from a first time to a second time) a location for each of the targets 104 located in the line-of-sight 112 associated with one or more of UAV 102a, UAV 102b, and UAV 102c.

At step 216, route determination application 124a determines a planned route for UAV 102a for the second time by solving an optimization problem. In certain embodiments, the optimization problem accounts for the location information (e.g., location, heading, and velocity) of UAV 102a, the location information (e.g., location, heading, and velocity) of neighboring UAVs 102b and 102c, and the predicted locations of targets 104 of the combined target information. Additionally, the optimization problem may account for a number of constraints, including line-of-sight constraints (e.g., due to one or more structures 114) associated with UAV 102a, line-of-sight constraints (e.g., due to one or more structures 114) associated with neighboring UAVs 102b and 102c, and kinematic constraints of UAVs 102a, 102b, and 102c.

In certain embodiments, route determination application 124a solves the optimization problem by minimizing a sum of determinants of covariances for each of the targets 104 of the combined target information over a time interval from the first time to the second time. By solving the optimization problem in this manner, route determination application 124a may determine optimal planned routes for UAVs 102a, 102b, and 102c for the second time, the optimal planned routes being routes that place UAVs 102a, 102b, and 102c in the best possible position (taking into account line-of-sight and kinematic constraints) at the second time to generate target information for the targets 104 (i.e., those targets 104 of the combined target information for the first time).

At step 218, route determination application 124a updates the planned route for UAV 102a to be the planned route determined in step 216. At step 220, route determination application updates the first time to be equal to the second time. At step 222, route determination application 124a causes UAV 102a to move according to the planned route determined in step 216.

At step 224, a determination is made as to whether the method is complete. If it is determined that the methods is complete (e.g., based on an input from target tracking system 116), the methods ends at step 226. Otherwise, the method return to 204 and route determination application 124a receives target information generated by target sensing unit 106a at the second time.

Figure 3:
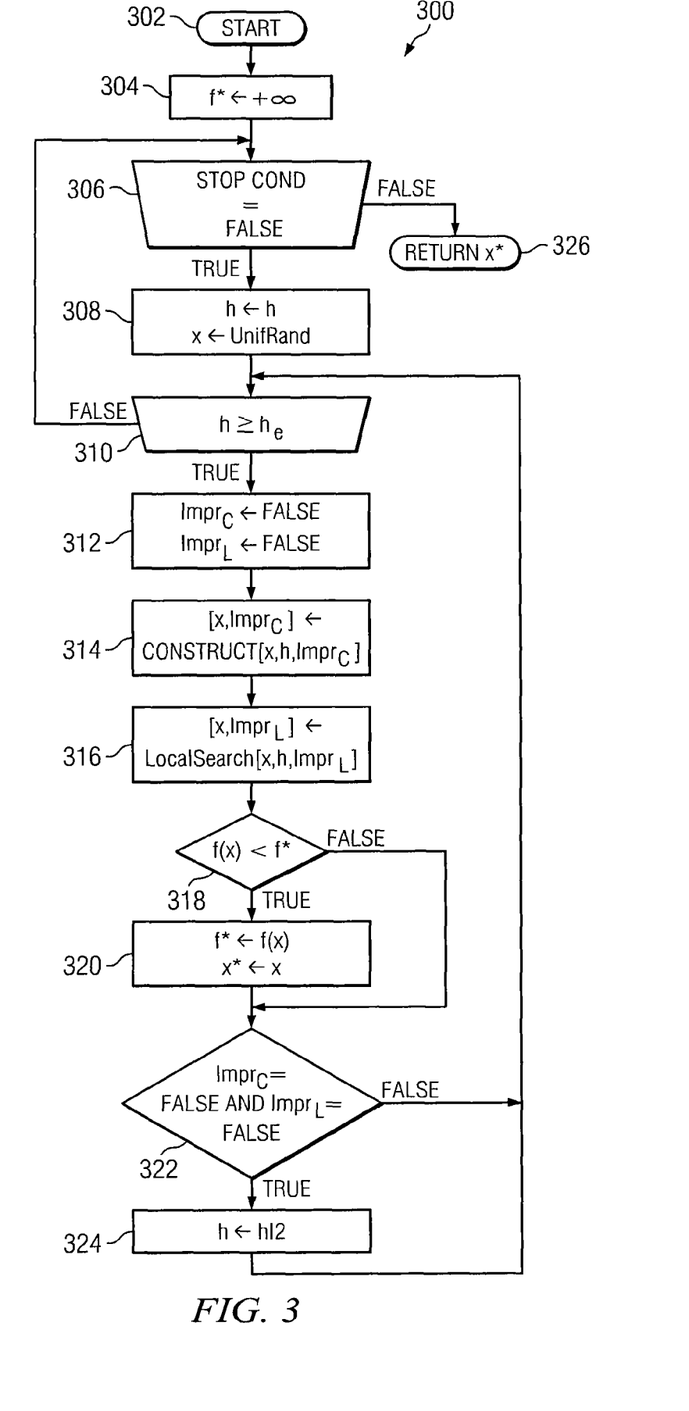
FIG. 3 illustrates an example method for solving an optimization problem in order to determine a planned route for a UAV in the example method illustrated in FIG. 2, according to certain embodiments of the present invention.

FIG. 3 illustrates an example method 300 for solving an optimization problem in order to determine a planned route for a UAV in the example method illustrated in FIG. 2, according to certain embodiments of the present invention. In particular, the illustrated example method is a continuous GRASP method for optimizing the objective function, F, of Equation 1 (described above).

The method begins at step 302. At step 304, the best solution for the objective function f (f*) is set to be at positive infinity. At step 306, a determination is made regarding whether any stop condition has been reached. Stop conditions may include, for example, a time limit, a number of iterations, or any other suitable stop condition. If a stop condition has not been met, the method continues to step 308. At step 308, an initial solution (x) is randomly defined and a discretization value h is defined to be a starting discretization $h_S$. At step 310, a determination is made regarding whether the discretization value h (defined as the starting discretization $h_S$) is greater than or equal to an ending discretization value ($h_e$).

If it is determined that the discretization value h is greater than or equal to an ending discretization value ($h_e$), a solution is constructed based on the starting solution (x) at step 314. At step 316, a local search is performed on the constructed solution to locate a better solution in the neighborhood of the constructed solution. If the located better solution in the neighborhood of the constructed solution (which is still called x) results in a better objective value than f* at step 318, then f* is updated and variable x* is updated with the current solution x at step 320.

At step 322, a determination is made as to whether the updates of step 320 result in an improved solution. If the updates of step 320 did not result in an improved solution, then the discretization value h is halved at step 324 (making the grid more fine than it was previously). If the updates of step 320 did result in an improved solution, the discretization value h is left unchanged and the process returns to step 310 and another solution is constructed based upon the improved solution. The method continues until the discretization value h is less than the ending discretization value ($h_e$), at which point the process returns to step 306 to determine if a stop condition is met. If a stop condition is determined to be met at step 306, the best determined solution x* is returned at step 326.

Thus, the continuous GRASP approach allows for starting with a coarse discretization value (h) and adaptively increasing the density of the discretization value as needed, thereby intensifying the search in a more dense discretization when a good solution has been found.

Although the present invention has been described with several embodiments, diverse changes, substitutions, variations, alterations, and modifications may be suggested to one skilled in the art, and it is intended that the invention encompass all such changes, substitutions, variations, alterations, and modifications as fall within the spirit and scope of the appended claims.

What is claimed is:

1. A method, comprising:
    accessing, using one or more processing units, first target information associated with a first target visible to a first UAV at a first time;
    accessing, using one or more processing units, second target information, received from a neighboring UAV, associated with a second target visible to the neighboring UAV at the first time;
    combining the first target information and the second target information to generate combined target information for the first time;
    determining, based on the combined target information, a predicted location for the first and second targets at a second time;
    determining a planned route for the first UAV for the second time by solving an optimization problem, the optimization problem accounting for the determined predicted location for the first and second targets and a plurality of constraints comprising:
        kinematic constraints associated with the first UAV and the neighboring UAV; and
        line-of-sight constraints associated with the first UAV and the neighboring UAV, wherein the line-of-sight constraints associated with the first UAV and the neighboring UAV correspond to one or more objects that obstruct a line-of-sight of at least one of the first UAV and the neighboring UAV.

2. The method of claim 1, wherein solving the optimization problem comprises minimizing a sum of determinants of covariances for each of the first and second targets over a time interval from the first time to the second time.

3. The method of claim 2, wherein the sum of the determinants of the covariances for each of the first and second targets is weighted with an importance function, the importance function defining one or more regions for which accurate first and second target information for the first and second targets is of increased importance.

4. The method of claim 1, wherein solving the optimization problem comprises using a continuous Greedy Randomized Adaptive Search Procedure (GRASP).

5. The method of claim 1, comprising:
    generating, prior to determining the predicted location for each of the first and second targets at the second time, a qualitative score for the combined target information; and
    determining whether the generated score is greater than a predetermined minimum score.

6. The method of claim 1, wherein the kinematic constraints associated with the first UAV and the neighboring UAV comprises one or more of a minimum turning radius, a minimum speed, and a maximum speed.

7. The method of claim 1, wherein the line-of-sight constraints associated with the first UAV and the neighboring UAV correspond to one or more buildings in an urban environment that obstruct the line-of-sight of at least one of the first UAV and the neighboring UAV.

8. The method of claim 1, wherein the first target and the second target are the same.

9. The method of claim 1, wherein the first target is visible to the first UAV such that the first target is directly detectable by the first UAV.

10. A system, comprising:
    one or more processing units operable to:
        access first target information associated with a first target visible to a first UAV at a first time;
        access second target information, received from a neighboring UAV, associated with a second target visible to the neighboring UAV at the first time;
        combine the first target information and the second target information to generate combined target information for the first time;
        determine, based on the combined target information, a predicted location for the first and second targets at a second time;
        determine a planned route for the first UAV for the second time by solving an optimization problem, the optimization problem accounting for the determined predicted location for the first and second targets and a plurality of constraints comprising:
            kinematic constraints associated with the first UAV and the neighboring UAV; and
            line-of-sight constraints associated with the first UAV and the neighboring UAV, wherein the line-of-sight constraints associated with the first UAV and the neighboring UAV correspond to one or more objects that obstruct a line-of-sight of at least one of the first UAV and the neighboring UAV.

11. The system of claim 10, wherein solving the optimization problem comprises minimizing a sum of determinants of covariances for each of the first and second targets over a time interval form the first time to the second time.

12. The system of claim 11, wherein the sum of the determinants of the covariances for each of the first and second targets is weighted with an importance function, the importance function defining one or more regions for which accurate first and second target information for the first and second targets is of increased importance.

13. The system of claim 10, wherein solving the optimization problem comprises using a continuous Greedy Randomized Adaptive Search Procedure (GRASP).

14. The system of claim 10, wherein the one or more processing units are operable to:
generate, prior to determining the predicted location for each of the first and second targets at the second time, a qualitative score for the combined target information; and
determine whether the generated score is greater than a predetermined minimum score.

15. The system of claim 10, wherein the kinematic constraints associated with the first UAV and the neighboring UAV comprises one or more of a minimum turning radius, a minimum speed, and a maximum speed.

16. The system of claim 10, wherein the line-of-sight constraints associated with the first UAV and the neighboring UAV correspond to one or more buildings in an urban environment that obstruct the line-of-sight of at least one of the first UAV and the neighboring UAV.

17. The system of claim 10, wherein the first target and the second target are the same.

18. The system of claim 10, wherein the first target is visible to the first UAV such that the first target is directly detectable by the first UAV.

19. A non-transitory, computer-readable medium having computer readable instructions stored thereon that, when executed by a computer, implement a method, comprising:
accessing first target information associated with a first target visible to a first UAV at a first time;
accessing second target information, received from a neighboring UAV, associated with a second target visible to the neighboring UAV at the first time;
combining the first target information and the second target information to generate combined target information for the first time;
determining, based on the combined target information, a predicted location for the first and second targets at a second time;
determining a planned route for the first UAV for the second time by solving an optimization problem, the optimization problem accounting for the determined predicted location for the first and second targets and a plurality of constraints comprising:
kinematic constraints associated with the first UAV and the neighboring UAV; and
line-of-sight constraints associated with the first UAV and the neighboring UAV, wherein the line-of-sight constraints associated with the first UAV and the neighboring UAV correspond to one or more objects that obstruct a line-of-sight of at least one of the first UAV and the neighboring UAV.

20. The computer-readable medium of claim 19, wherein solving the optimization problem comprises minimizing a sum of determinants of covariances for each of the first and second targets over a time interval from the first time to the second time.

21. The computer-readable medium of claim 20, wherein the sum of the determinants of the covariances for each of the first and second targets is weighted with an importance function, the importance function defining one or more regions for which accurate first and second target information for the first and second targets is of increased importance.

22. The computer-readable medium of claim 19, wherein solving the optimization problem comprises using a continuous Greedy Randomized Adaptive Search Procedure (GRASP).

23. The computer-readable medium of claim 19, wherein the software is operable to perform operations comprising:
generating, prior to determining the predicted location for each of the first and second targets at the second time, a qualitative score for the combined target information; and
determining whether the generated score is greater than a predetermined minimum score.

24. The computer-readable medium of claim 19, wherein the kinematic constraints associated with the first UAV and the neighboring UAV comprises one or more of a minimum turning radius, a minimum speed, and a maximum speed.

25. The computer-readable medium of claim 19, wherein the line-of-sight constraints associated with the first UAV and the neighboring UAV correspond to one or more buildings in an urban environment that obstruct the line-of-sight of at least one of the first UAV and the neighboring UAV.

26. The computer-readable medium of claim 19, wherein the first target and the second target are the same.

27. The computer-readable medium of claim 19, wherein the first target is visible to the first UAV such that the first target is directly detectable by the first UAV.

* * * * *